United States Patent
Fukushima

(10) Patent No.: US 12,068,491 B2
(45) Date of Patent: Aug. 20, 2024

(54) MONITORING SYSTEM, BATTERY-TYPE POWER SUPPLY DEVICE, MONITORING SERVER APPARATUS AND MONITORING PROGRAM

(71) Applicant: NOVARS INC., Tokyo (JP)

(72) Inventor: Toshitaka Fukushima, Tokyo (JP)

(73) Assignee: NOVARS INC., Tokyo (JP)

( * ) Notice: Subject to any disclaimer, the term of this patent is extended or adjusted under 35 U.S.C. 154(b) by 806 days.

(21) Appl. No.: 17/224,174

(22) Filed: Apr. 7, 2021

(65) Prior Publication Data

US 2021/0226289 A1  Jul. 22, 2021

Related U.S. Application Data

(63) Continuation of application No. PCT/JP2019/041120, filed on Oct. 18, 2019.

(30) Foreign Application Priority Data

Oct. 18, 2018  (JP) .................................. 2018-196263

(51) Int. Cl.
*H01M 50/20* (2021.01)
*G08C 17/02* (2006.01)
*G08C 23/04* (2006.01)

(52) U.S. Cl.
CPC ............ *H01M 50/20* (2021.01); *G08C 17/02* (2013.01); *G08C 23/04* (2013.01)

(58) Field of Classification Search
CPC ........ H01M 50/20; G08C 17/02; G08C 23/04
See application file for complete search history.

(56) References Cited

U.S. PATENT DOCUMENTS

2008/0252509 A1* 10/2008 Yokozawa ............ G08C 23/04
                                                    341/176
2018/0315968 A1  11/2018 Koyama et al.

FOREIGN PATENT DOCUMENTS

JP         2004-274296 A        9/2004
JP         2008-283669 A       11/2008
                    (Continued)

OTHER PUBLICATIONS

International Search Report issued in PCT/JP2019/041120 mailed on Nov. 26, 2019 with English Translation (5 pages).

*Primary Examiner* — Robert Grant
(74) *Attorney, Agent, or Firm* — Nakanishi IP Associates, LLC

(57) ABSTRACT

A monitoring system includes a battery-type power supply device. The battery-type power supply device is mounted in a battery box of an operation device for remotely operating an external device. A server apparatus is connected via a network to the battery-type power supply device. The battery-type power supply device includes current detection means for detecting an internal current flowing in the operation device, and transmission means for transmitting data indicating a fluctuation in the detected internal current to outside. The server apparatus includes means for receiving the data indicating a fluctuation, operation identification means for identifying an operation portion that has been operated in the external device based on the data indicating the fluctuation, and means for transmitting information relating to the identified operation portion or a result of aggregation of the information to external processing devices via the network.

13 Claims, 9 Drawing Sheets

(56) References Cited

FOREIGN PATENT DOCUMENTS

| | | |
|---|---|---|
| JP | 2015-46769 A | 3/2015 |
| JP | 2016-178599 A | 10/2016 |
| WO | 2017/115602 A1 | 7/2017 |

* cited by examiner

| BATTERY-TYPE POWER SUPPLY DEVICE ID | RELAY TERMINAL ID | USER ID | PLACE | DEVICE NAME |
|---|---|---|---|---|
| MA-00101-a | TAR-1001 | REQ-1031 REQ-1452 | LIVING ROOM | TELEVISION REMOTE CONTROL |
| MA-03102-b | TAR-1001 | REQ-1031 REQ-1452 | LIVING ROOM | AIR CONDITIONER REMOTE CONTROL |
| MA-10151-y | TAR-1001 | REQ-1031 REQ-1452 | BEDROOM | TELEVISION REMOTE CONTROL |
| MA-09300-d | TAR-1001 | REQ-1031 REQ-1452 | BEDROOM | AIR CONDITIONER REMOTE CONTROL |
| MA-20179-f | TAR-1001 | REQ-1031 REQ-1452 | STUDY | TELEVISION REMOTE CONTROL |
| MA-81924-b | TAR-1002 | REQ-8352 | STUDY | AIR CONDITIONER REMOTE CONTROL |
|  |  |  |  |  |
|  |  |  |  |  |

FIG.7

(OPERATION TABLE FOR CUSTOMER CODE: 01011010)

| BUTTON TYPE | DATA CODE |
|---|---|
| power | 00000000 |
| ch1 | 10000000 |
| ch2 | 10100000 |
| ch3 | 10010010 |
| ch4 | 01001001 |
| ch5 | 01110111 |
| ch6 | 00100100 |
| ch7 | 01010111 |
| ch8 | 11010111 |
| ch9 | 00000111 |
| ch10 | 10000110 |
| ch11 | 00101101 |
| ch12 | 11100100 |
| VOLUME UP | 11111001 |
| VOLUME DOWN | 11111101 |

FIG.9

MONITORING SYSTEM, BATTERY-TYPE POWER SUPPLY DEVICE, MONITORING SERVER APPARATUS AND MONITORING PROGRAM

CROSS-REFERENCE TO RELATED APPLICATIONS

This application is a continuation application of International Patent Application No. PCT/JP2019/041120 filed on Oct. 18, 2019, which is based upon and claims the benefit of priority from the prior Japanese Patent Application No. 2018-196263, filed Oct. 18, 2018 the entire contents of which are incorporated herein by reference.

FIELD

Embodiments described herein relate generally to a monitoring system, a battery-type power supply device, a monitoring server apparatus and a monitoring program.

BACKGROUND

Recent years have seen the appearance of various watching-monitoring systems for elderly persons which use sensor technology. A watching-monitoring system is, for example, a system in which a human presence sensor is installed in a location that an elderly person always uses in a house, such as a bathroom, and sensor information from the human presence sensor is collected by a server apparatus. A child of the elderly person who is at a location distant from the elderly person can use a portable information terminal such as a smartphone to view a result of the collection of the sensor information on a watch site provided by a server apparatus.

A battery-type power supply device is available that can be mounted as a dry battery in a battery box of an existing home appliance remote control. The battery-type power supply device has a wireless communication function. For example, the battery-type power supply device is mounted in the battery box of a television remote control that uses an infrared LED, and sends a signal wirelessly upon detecting a current that flows to the infrared LED when a user operates a button of the television remote control, so that a family member or the like at a location distant from the user of the television remote control can know the frequency of usage of the television remote control.

However, although a battery-type power supply device that is mounted in a television remote control can detect that a remote control button has been pressed, it has not been able to determine which button has been pressed.

SUMMARY OF THE INVENTION

An object of the present invention is to easily realize a system that remotely monitors operations with respect to a main body device by an operation device such as a television remote control having a plurality of manual operation portions.

A monitoring system according to the present embodiment has a battery-type power supply device. The battery-type power supply device is mounted in a battery box of an operation device for remotely operating an external device. A server apparatus is connected via a network to the battery-type power supply device. The battery-type power supply device includes: current detection means for detecting an internal current flowing in the operation device; and transmission means for transmitting data indicating a fluctuation in the detected internal current to outside. The server apparatus includes: means for receiving the data indicating a fluctuation; operation identification means for identifying an operation portion that has been operated in the external device based on the data indicating a fluctuation; and means for transmitting information relating to the identified operation portion or a result of aggregation of the information to an external processing device via a network.

BRIEF DESCRIPTION OF THE VIEWS OF THE DRAWING

FIG. 7 is a view illustrating a management table of a battery-type power supply device that is stored on an HDD of the server apparatus shown in FIG. 6;

FIG. 9 is a view illustrating an operation table that is stored on the HDD of the server apparatus shown in FIG. 6.

DETAILED DESCRIPTION

Figure 1:
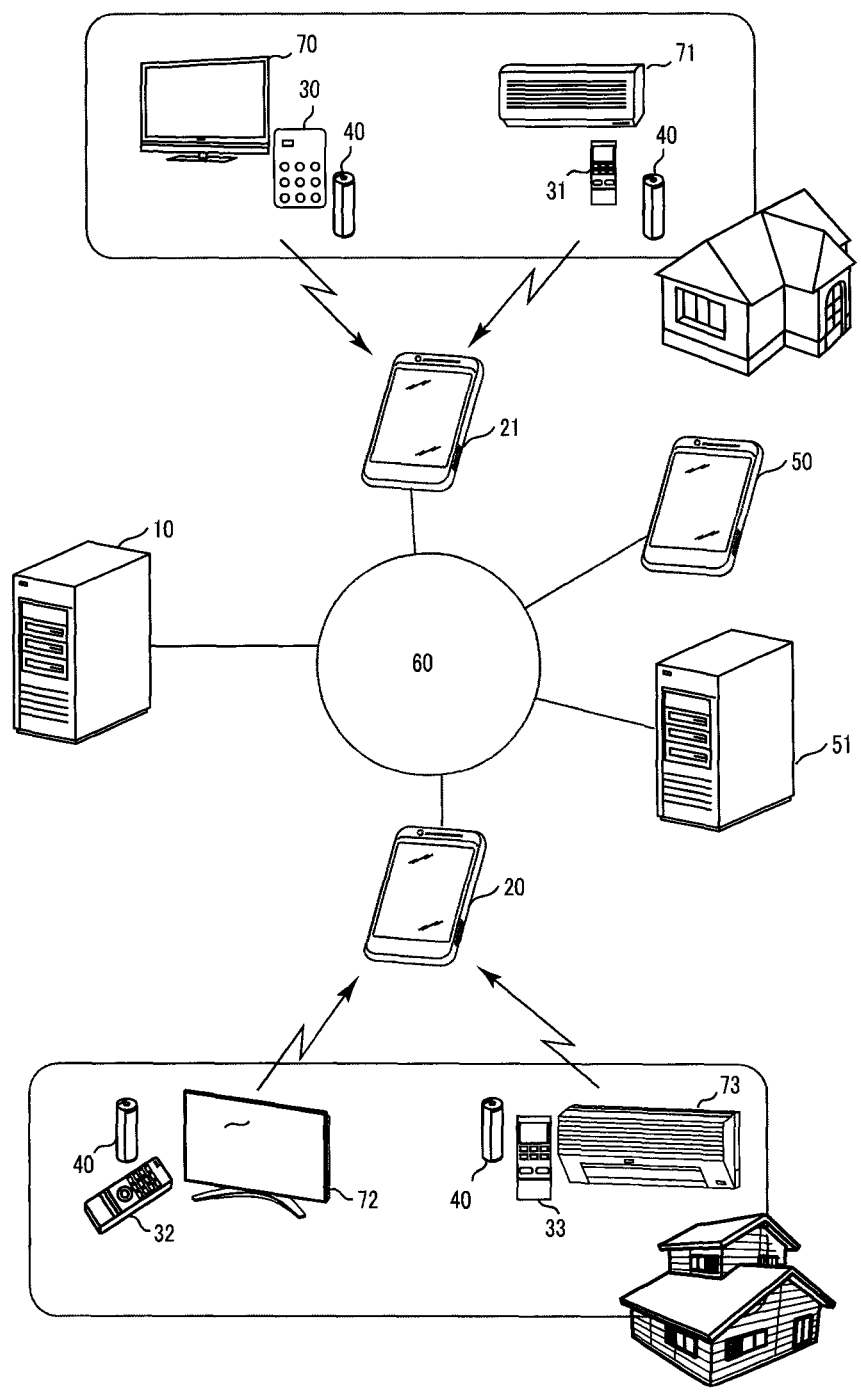
FIG. 1 is a view illustrating a general configuration including a monitoring system according to the present embodiment.

A monitoring system according to the present embodiment realizes monitoring of operations of a main body device by a manual operation portion by using, as it is, an existing operation device such as a television remote control having a plurality of manual operation portions (operation buttons) for remotely operating the operations of an external device (device to be operated) such as a television set. A monitoring target in this monitoring system is a battery-driven-type television remote control, air conditioner remote control, light remote control or the like that has a battery box for housing a battery and manual operation portions such as buttons or switches for a user to manually operate. A battery-type power supply device having a shape and dimensions which conform to battery standards is mounted in the battery box of the aforementioned operation device such as a television remote control.

As is well known, in a television remote control or the like, infrared rays are emitted in an on/off manner or a radio field intensity changes according to a pattern corresponding to a manual operation portion that has been operated. An internal current that flows in the operation device also changes according to that action. The battery-type power supply device has a function that detects an internal current flowing in the operation device in which the battery-type power supply device is mounted, and transmits data indicating a fluctuation in the detected internal current to an external server apparatus via a relay terminal such as a smartphone or directly together with an ID that identifies the battery-type power supply device (battery-type power supply device ID) and a time code indicating the time at which the manual operation portion was operated.

Digital data obtained by performing AD conversion of the current using a predetermined sampling frequency preferably a Nyquist frequency capable of reproducing the current waveform, digital data obtained by binarizing the current using a predetermined threshold value, a code obtained by encoding digital data according to a predetermined rule, or data in any other format can be applied as the data indicating a fluctuation in the internal current. Here, the data will be described as binary data (a data code) of a section for identifying operation buttons of the operation device. The server apparatus appropriately aggregates the data codes, the battery-type power supply device IDs, and the time codes representing times at which manual operation portions were operated, and transmits the result of the aggregation to a predetermined external information processing device (client terminal). In the present embodiment, a system that utilizes a battery-operated operation device such as a television remote control or an air conditioner remote control as it is and remotely monitors what way the external device was operated by means of the operation device can be simply realized.

Hereunder, the monitoring system according to the present embodiment will be described with reference to the drawings. In the following description, the same reference numerals denote components having substantially identical functions and structures, and the repeated description thereof is made only when necessary.

As illustrated in FIG. 1, the monitoring system has a server apparatus 10. A battery-type power supply device 40 is connected via a network 60 to the server apparatus 10. The battery-type power supply device 40 is connected via relay terminals 20 and 21, or directly, to the server apparatus 10. The battery-type power supply device 40 is typically connected in conformity with the Bluetooth (registered trademark) communication standard to the relay terminals 20 and 21. Alternatively, the battery-type power supply device 40 is directly connected to the server apparatus 10 in conformity with various LPWA (Low Power, Wide Area) communication standards.

The battery-type power supply device 40 has a shape and size which conform to battery standards, and houses therein a battery that has a smaller size than the battery-type power supply device 40 and functions as a power source of the operation device. The battery-type power supply device 40 will be described in detail later. The battery-type power supply device 40 is mounted in a battery box (also referred to as "battery holder") of, for example, television remote controls 30 and 32 and air conditioner remote controls 31 and 33 as operation devices for remotely operating, for example, television sets and 70 and 72 and air conditioner indoor unit main bodies 71 and 73 as external devices.

Further, external information processing devices (client terminals) 50 and 51 are connected via the network 60 to the server apparatus 10. The server apparatus 10 transmits aggregate results pertaining to the operation devices to the plurality of client terminals 50 and 51. The client terminal 50 is an information communication terminal possessed by a user who utilizes a monitoring service provided by the monitoring system, and, for example, is a smartphone, a tablet or a PC. The user can use the client terminal 50 to access a monitor site provided by the server apparatus 10 and view aggregate results relating to operation of the external devices by the operation devices.

Figure 2A:
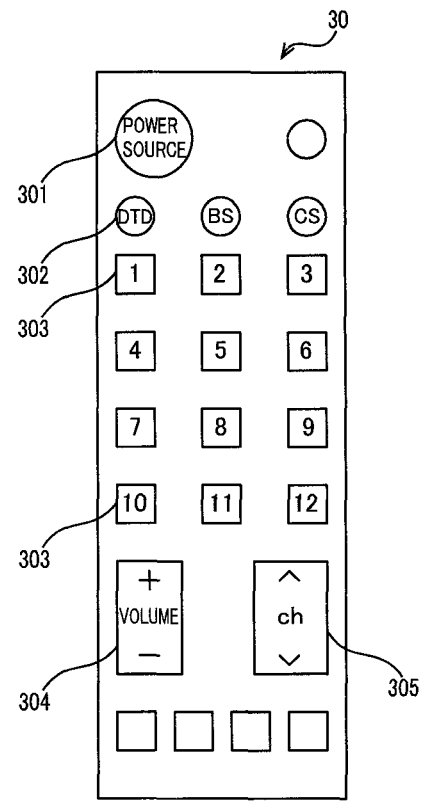
FIG. 2A and FIG. 2B are external views of a television remote control shown in FIG. 1.
Figure 2B:
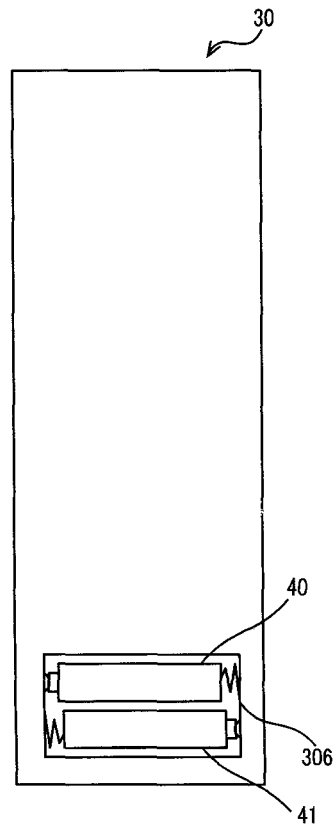

Note that, here, for convenience of description, the TV remote control 30 will be described as an example of the operation device. As illustrated in FIG. 2A, typically, the television remote control 30 includes manual operation portions such as a power button 301, broadcast type switching buttons 302, channel selection buttons (also referred to as "selection buttons") 303, a volume control button 304 and a channel sequential selection button 305. Further, as illustrated in FIG. 2B, a battery box 306 is provided in the television remote control 30. Two AA size batteries 40 and 41 are mounted in the battery box 306 for use, however, in this example, one of the two AA size batteries 40 and 41 is replaced with the battery-type power supply device 40 that has a shape and dimensions conforming to the AA standard.

Figure 3:
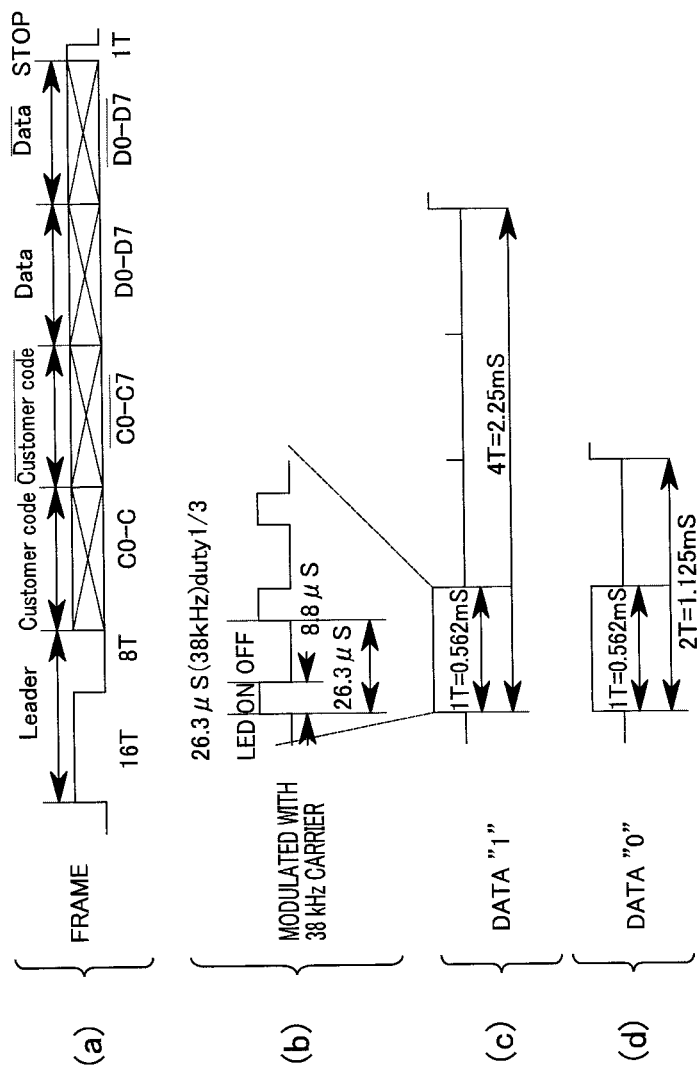
FIG. 3 is an explanatory drawing of an infrared transmission system of the television remote control shown in FIG. 1.

Here, a format of NEC (registered trademark) that is widely used for the data format of television remote controls which use an infrared LED in Japan will be described as an example. As illustrated in FIG. 3($a$), a frame is composed of a leader code indicating the start of a signal of a remote control, a customer code for identifying the manufacturer (maker) or supplier of the remote control or an external device operated by the remote control, a data code for identifying an operation button such as a channel button or a sound button, and a stop code that indicates that the signal from the remote control has ended.

As illustrated in FIG. 3($b$), driving of the infrared LED is modulated with a 38 kHz subcarrier with a duty ratio of 1/3. Since the period of 38 kHz is 26.3 µs, the time for which the LED is actually turned on is 1/3 of that time, that is, 8.8 µs. For the leader code, the infrared LED is modulated at 38 kHz and kept in the ON state for a duration of 16 T, that is, a period of 9 ms, and is turned OFF for the next 8 T, that is, a period of 4.5 ms. A customer code (maker identification code) of 16 bits follows the leader code. The latter half of the customer code is the inverted value of the data of the first half for error checking. The customer code is followed by 16 bits of data code. The 8 bits of the latter half of the data code are also for error checking and are obtained by inverting the first 8 bits.

As illustrated in FIG. 3($c$), T represents the modulation unit, and is 0.562 ms. During the first 1 T, the infrared LED repeatedly turns on and off intermittently in a short time due to modulation with the 38 KHz subcarrier. For data "1", the infrared LED is off during the next 3 T. Accordingly the data "1" requires 4T=2.25 ms.

As illustrated in FIG. 3($d$), although the first 1 T is the same as for the data "1", the infrared LED is off during the next 1 T. Accordingly, the data "0" requires 2 T=1.125 ms. A stop bit for 1 T follows after the data code. That is, the maker can be identified by the customer code, and operation buttons can be identified from the data code based on the identified maker.

Figure 4A:
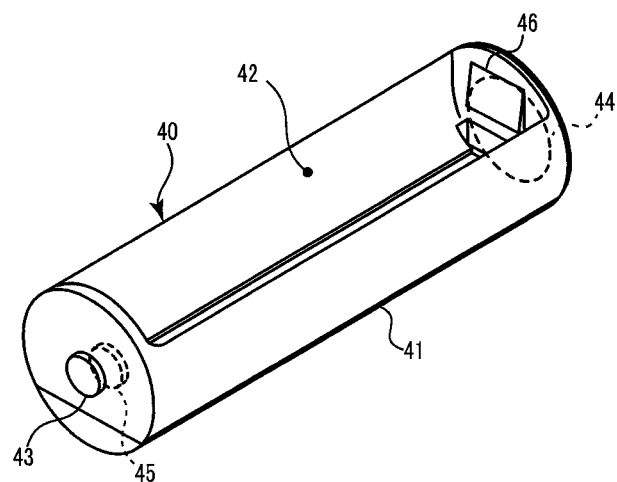
FIG. 4A and FIG. 4B are views illustrating a battery-type power supply device shown in FIG. 1.
Figure 4B:
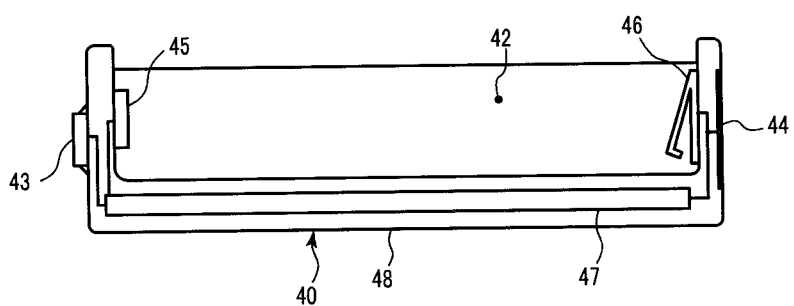
Figure 5:
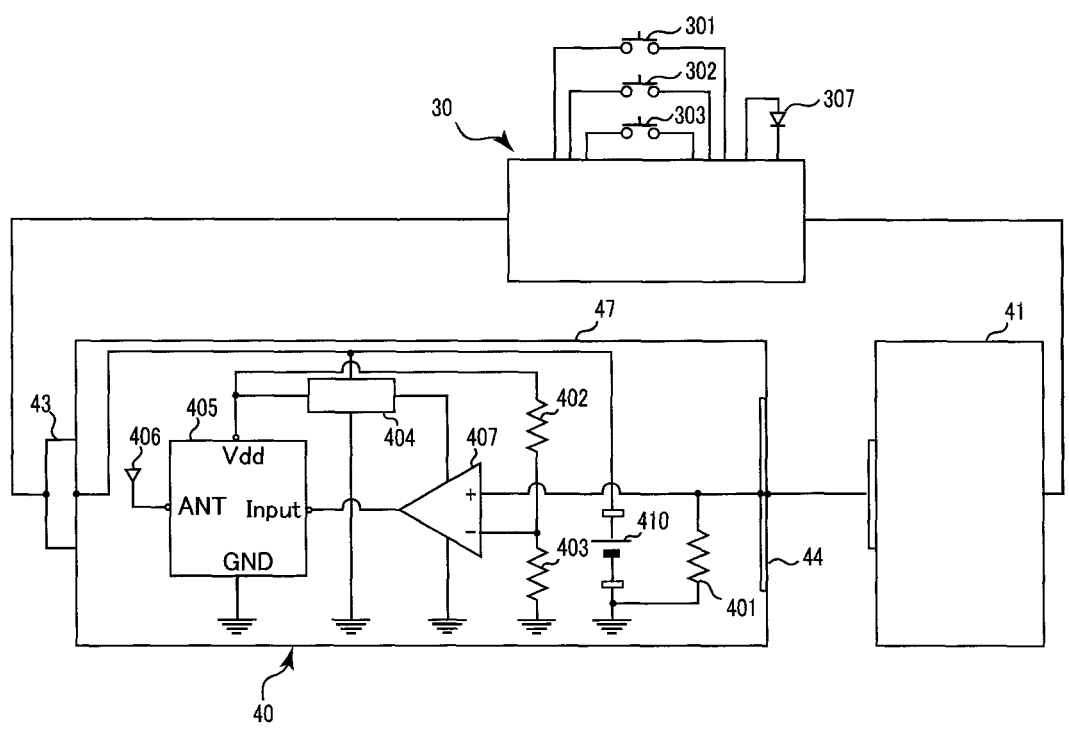
FIG. 5 is an equivalent circuit diagram of the battery-type power supply device shown in FIG. 1.

FIG. 4A is a perspective view illustrating the external appearance of the battery-type power supply device 40 shown in FIG. 1. FIG. 4B is a cross-sectional view illustrating the internal structure of the battery-type power supply device 40 shown in FIG. 1. FIG. 5 is an equivalent circuit diagram of the battery-type power supply device 40 shown in FIG. 1. The battery-type power supply device 40 typically has a shape and dimensions which conform to battery standards. The description will be made assuming that the battery-type power supply device 40 conforms to the AA battery standard. The battery-type power supply device 40 has a cylindrical-shaped case 48 that has a height and diameter conforming to the AA battery standard. At front and rear outer end faces of the case 48, an outer positive terminal 43 and an outer negative terminal 44 are provided in conformity to the AA battery standard. The battery-type power supply device 40 has a cylindrical-shaped battery housing section 42 that houses an AAA battery (housed battery). At centers of front and rear inner end faces of the battery housing section 42, conductive plates are attached as an inner positive terminal 45 and an inner negative terminal 46, respectively. The battery housing section 42 has a cylinder central axis that is offset in a radial direction with respect to a cylinder central axis of the case 48. This offset secures a small space between the inner face of the case 48 and the outer face of the battery housing section 42. An electronic circuit board 47 that realizes various functions of the battery-type power supply device 40 is mounted in this small space. A circumferential surface of the case is partially cut out in an oval shape on an opposite side of the central axis of the case 48 to a side on which the electronic circuit board 47 is disposed. The length of the cut-out part is equal to or slightly shorter than the length of the AAA battery, and the width is somewhat wider than the width of the AAA battery. An AAA battery (housed battery) 410 is inserted into or removed from the battery housing section 42 through this cut-out part.

The positive terminal of the AAA battery 410 housed in the battery housing section 42 comes into contact with the inner positive terminal 45, and the negative terminal of the AAA battery 410 comes into contact with the inner negative terminal 46. The inner positive terminal 45 and the inner negative terminal 46 are electrically connected to the outer positive terminal 43 and the outer negative terminal 44, respectively through cables or the like. In addition, the inner positive terminal 45 and the outer positive terminal 43 are electrically connected to the electronic circuit board 47.

FIG. 5 is an equivalent circuit diagram of the battery-type power supply device 40. In this case, the battery-type power supply device 40 is mounted in the battery box 306 of the television remote control 30 together with another battery 41. Various operation buttons 301, 302, 303 and the like are provided together with an infrared LED 307 in the television remote control 30. On the electronic circuit board 47 are mounted: a detection resistor 401 that converts an internal current flowing through the television remote control 30 into a voltage; a comparator 407 that compares a voltage across the detection resistor 401 (detected voltage) with a reference voltage and outputs the comparison result as a bit string; an RFIC 405 that, based on the comparison result output from the comparator 407, recognizes the leader code, and triggered by recognition of the leader code, identifies the customer code that identifies the maker and the data code identifying the operation button 301, 302, 303 or the like, and also attaches an ID identifying the battery-type power supply device 40 (hereinafter, referred to as "battery-type power supply device ID") and a time code indicating the operation time to the customer code and the data code and transmits the resultant data to the relay terminal 20 via an antenna 406; a DC-DC converter 404 that uses a battery voltage of the battery 410 housed in the battery housing section 42 to generate a drive voltage for the comparator 407 and the RFIC 405; and divider resistors 402 and 403 that divide the output of the DC-DC converter 404 to generate a reference voltage.

Figure 8:
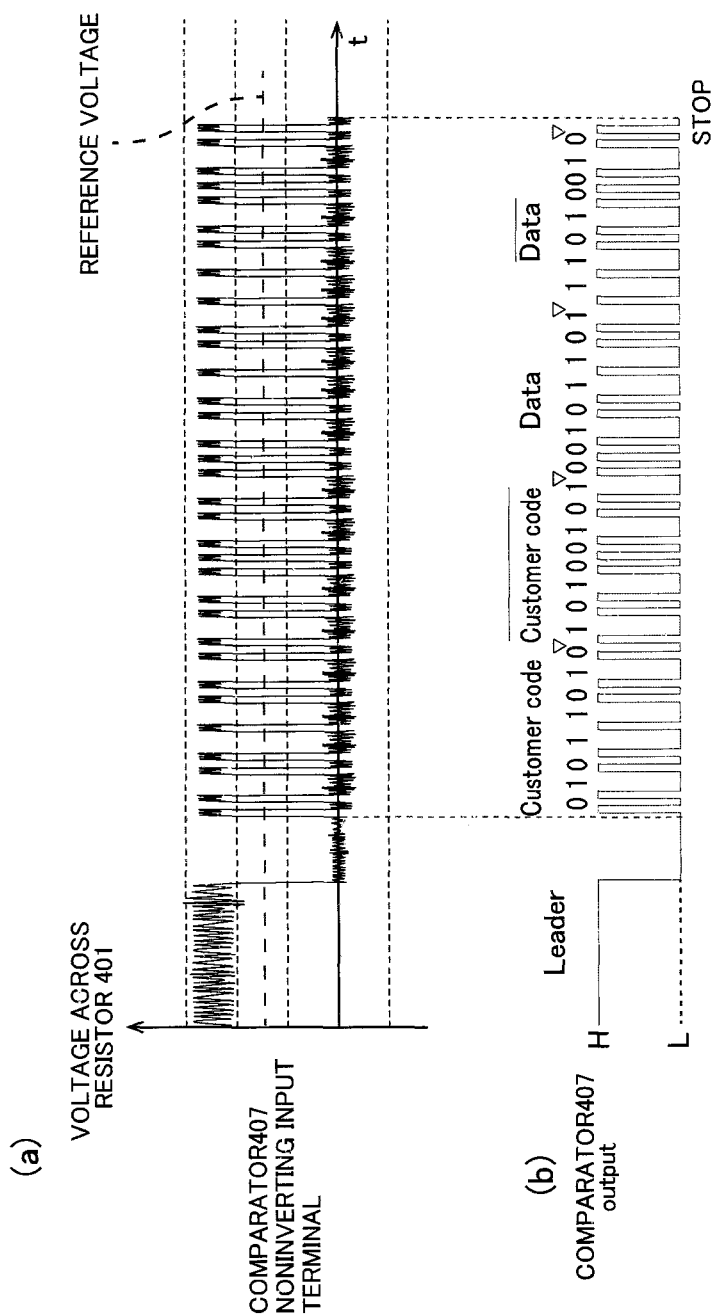
FIG. 8 is a view illustrating a customer code and a data code shown in FIG. 6.

The detection resistor 401 is interposed between the inner negative terminal 46 and the outer negative terminal 44. A connection node between the inner negative terminal 46 and the detection resistor 401 is connected to GND. The divider resistors 402 and 403 are connected in series and interposed between GND and a connection node between the inner positive terminal 45 and the outer positive terminal 43. An input terminal of the DC-DC converter 404 is connected to another connection node between the inner positive terminal 45 and the outer negative terminal 44. Output terminals of the DC-DC converter 404 are connected to a power source terminal of the RFIC 405 and a power source terminal of the comparator 407. The non-inverting input terminal of the comparator 407 is connected to a connection node between the detection resistor 401 and the outer negative terminal 44, and the inverting input terminal of the comparator 407 is connected to a connection node between the divider resistor 402 and the divider resistor 403. When the operation button 303 or the like of the television remote control 30 is pressed, the infrared LED is driven to blink according to the format mentioned above. The current of the detection resistor 401 changes according to the blinking driving of the infrared LED. The combination of the resistance values of the divider resistors 402 and 403 and the detection resistor 401 is adjusted in advance so that the detected voltage becomes higher than the reference voltage when the infrared LED is turned on, and the detected voltage becomes lower than the reference voltage when the infrared LED is turned off (See FIGS. 8(*a*) and (*b*). The comparator 407 compares the detected voltage with the reference voltage, and outputs the comparison result to the RFIC 405. As described above, the RFIC 405 identifies the customer code for identifying the maker and identifies the data code for identifying the operation button 301, 302 or 303, based on the comparison result output from the comparator 407. A communication section of the RFIC 405 transmits its own battery-type power supply device ID and time code to the relay terminal 20 together with the customer code and the data code via the antenna 406. Note that, the customer code, data code, battery-type power supply device ID and time code are collectively referred to as "operation data" and are used as appropriate. The relay terminal 20 transmits the operation data received from the RFIC 405 to the server apparatus 10. The communication section of the RFIC 405 may of course be a section that directly transmits the operation data to the server apparatus 10 using the LPWA communication standard.

The timing for transmitting the operation data may be arbitrarily set. Although typically the RFIC 405 will transmit the operation data each time the RFIC 405 recognizes the leader code and identifies the customer code and data code, a configuration may also be adopted in which operation data is stored in an internal memory (flash memory) of the RFIC 405, and data transmission of the stored data to the relay terminal 20 is executed collectively at a predetermined timing, for example, every hour or at a specified time such as at twelve midnight. Further, a configuration may also be adopted so that, when the relay terminal 20 is not connected to the RFIC 405, the RFIC 405 stores the operation data in the internal memory, and subsequently transmits the stored data collectively to the relay terminal 20 when connected to the relay terminal 20.

Here, operations when the operation button 303 or the like of the television remote control 30 is manually pressed in a state in which the battery-type power supply device 40 is actually mounted in the television remote control 30 will be specifically described. When a current flows through the infrared LED for 8.8 μs, a voltage is generated in the detection resistor 401, and when the value of that voltage is larger than the voltage divided by the resistors 402 and 403, the comparator 407 is turned on. The driving current of the infrared LED is larger (100 mA to 1 A) compared to when the LED is off, is easily distinguished. When the comparator 407 turns on, the output terminal of the RFIC 405 becomes active ("H" input).

The way in which data sent by the television remote control 30 is identified will now be described (see FIG. 3(*a*)

to (d)). Sampling is performed with a clock inside the RFIC 405, for example, 500 kHz (with a period of 2 μs). When modulated at 38 kHz, the infrared LED is lit for 8.8 μs and extinguished for 17.6 μs. The result of sampling is that "H" continues for four times and "L" continues for nine times. This is taken as the basis. In the case of the data "1", repetition of "L" and "H" continues for 0.562 ms (sampling number is 263 times), and thereafter the "L" state continues for 1.69 ms. In the case of the data "0", repetition of "L" and "H" continues for 0.562 ms, and thereafter the "L" state continues for 0.562 ms. In the case of the leader code, repetition of "L" and "H" continues for 9 ms (sampling number is 4,500 times) and thereafter the "L" state continues for 4.5 ms. In the case of the stop bit, repetition of "L" and "H" continues for 0.562 ms, and thereafter the state changes to the "L" state. Data can be identified by performing sampling in this way. If an integrating circuit (filter) is inserted between the comparator 407 and the RFIC 405, the sampling frequency can be slowed down.

For example, the customer code and the data code are identified as follows. That is, a current flowing through the detection resistor 401 fluctuates as a result of the television remote control 30 being operated, and as illustrated in FIG. 8(a), the voltage across the detection resistor 401 is applied as the detected voltage to the non-inverting input terminal of the comparator 407. The comparator 407 compares the detected voltage with the reference voltage. As illustrated in FIG. 8(b), the comparator 407 outputs a high level voltage, that is, "H", when the detected voltage is higher than the reference voltage, and outputs a low level voltage, that is, "L", when the detected voltage is lower than the reference voltage. The RFIC 405 distinguishes between the data "0" and data "1" based on a voltage signal as a bit string which is output from the comparator 407, and thereby identifies the customer code and data code. In the example illustrated in FIG. 8(b), the RFIC 405 transmits "01011010" as the customer code and "00101101" as the data code to the server apparatus 10 via the relay terminal 20 together with the battery-type power supply device ID and the time code.

Figure 6:
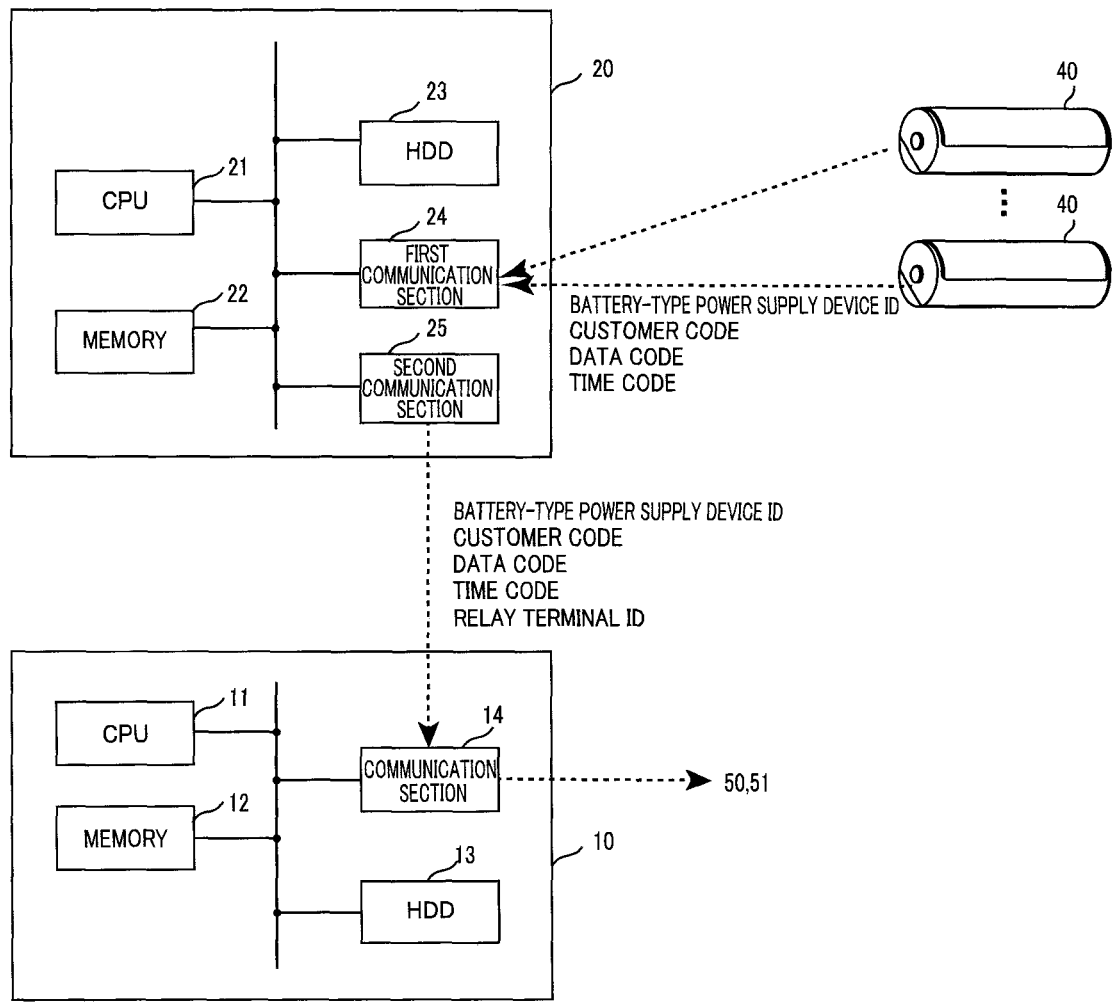
FIG. 6 is a configuration diagram of a relay terminal and a server apparatus shown in FIG. 1.

As illustrated in FIG. 6, the relay terminal 20 is an information communication terminal having a relay function between the battery-type power supply device 40 and the server apparatus 10, and examples of the relay terminal 20 include a smartphone, a tablet, a PC, and a router. The relay terminal 20 includes a CPU 21, a memory 22, a hard disk drive (HDD (a non-transitory storage medium)) 23, a first communication section 24 and a second communication section 25. The CPU 21 performs centralized control of the respective components of the relay terminal 20. The memory 22 functions as a work area that temporarily stores a program and received data, or the like. The first communication section 24 performs communication conforming to the Bluetooth (registered trademark) standard to receive a signal including the operation data transmitted from the battery-type power supply device 40. The second communication section 25 performs communication conforming to the long term evolution (LTE) standard to transmit a signal including the operation data and a relay terminal ID to the server apparatus 10. The HDD 23 stores data relating to application software program pertaining to the monitoring service (hereinafter, referred to as "monitoring app"). By placing a Bluetooth (registered trademark) receiving function of the relay terminal 20 in an ON state and placing the monitoring app in an activated state, the relay terminal 20 enters a state in which it is ready to receive items of operation data from each of a plurality of battery-type power supply devices 40 that have been paired with the relay terminal 20 in advance. When the relay terminal 20 has received operation data, the relay terminal 20 transmits the operation data to the server apparatus 10 together with the relay terminal ID that identifies the relay terminal 20 itself.

The server apparatus 10 has a CPU 11, a memory 12, an HDD 13 and a communication section 14. The CPU 11 performs centralized control of the respective components of the server apparatus 10. The memory 22 functions as a work area that temporarily stores a program, received data, and data being processed, or the like. The communication section 14 performs server communication processing conforming to the LTE standard to receive the operation data and the relay terminal ID from the relay terminal 20. Data relating to a server program pertaining to the monitoring service (hereinafter, referred to as "monitoring server program") is stored on the HDD 13. The CPU 11 loads the monitoring server program from the HDD 13 to the memory 12, and realizes various operations by executing the loaded program. Data relating to a plurality of operation tables is stored for each maker (manufacturer or supplier) on the HDD 13. As illustrated in FIG. 9, the operation table is a correspondence table in which data codes and button types are associated. The monitoring server program selects one operation table from the plurality of operation tables according to the customer code, and refers to the data code in the selected operation table to thereby identify the type of button that has been operated. For example, in accordance with the customer code "01011010" received from the battery-type power supply device 40, the server apparatus 10 selects an operation table shown in FIG. 9 from the plurality of operation tables, and identifies a button type "ch11" corresponding to the data code "00101101". A battery-type power supply device management table illustrated as an example in FIG. 7 is also stored on the HDD 13. The items "battery-type power supply device ID", "relay terminal ID", "user ID", "place" and "device name" are described for each record of the battery-type power supply device management table.

Note that, in the present embodiment, the battery-type power supply device 40 identifies a customer code and a data code based on a detected voltage detected by the detection resistor 401, and the server apparatus 10 identifies a button that has been operated on the television remote control 30 based on the customer code and the data code receive from the battery-type power supply device 40. However, a configuration may be adopted so that voltage data pertaining to a detected voltage is transmitted from the battery-type power supply device 40 to the server apparatus 10, and the server apparatus 10 performs processing for identifying the customer code and data code based on the detected voltage. Further, a configuration may be adopted so that an operation table as illustrated in FIG. 9 is stored in the battery-type power supply device 40, and the battery-type power supply device 40 identifies a button operated on the television remote control 30 based on the customer code and the data code, and transmits data indicating the button type to the server apparatus 10.

Further, in addition to the aforementioned items, for example, the maker of the remote control in which the battery-type power supply device is mounted may also be described in the battery-type power supply device management table. Because the maker of the remote control in which the battery-type power supply device is mounted can be identified by the battery-type power supply device ID, it is not necessary to transmit the customer code to the server apparatus 10 from the battery-type power supply device 40. The monitoring server program identifies the type (maker) of the remote control by means of the battery-type power supply device ID, and identifies the type of button that has been operated by referring to the data code in an operation table corresponding to the identified type of remote control.

In addition, whilst an operation table is stored for each maker on the HDD 13 of the server apparatus 10, an operation table may also be stored for each infrared format. For example, similarly to identifying the customer code and the data code based on the detected voltage, differences between formats can be distinguished by identifying places that differ in the formats such as the frame length and the leader code of the data based on the detected voltage. It is thus possible to support a wide range of remote control types.

The monitoring server program uses the operation table or battery-type power supply device management table or the like as appropriate to aggregate the operation data by an aggregation method according to the intended use of the operation data that is specified in advance for each of the client terminals 50 and 51. Typically, the number of operations for each operation device in a specific period such as one day or one hour is counted by distinguishing the operations with respect to each main body device.

With regard to the use of the operation data, if the operation data is data pertaining to television channels or the like, it is possible to check the audience rating based on the TV program being viewed by identifying the channel. Further, the contents of the TV program being viewed can be analyzed to check the preference of the viewer. The operation data can also be used to provide recommended information or the like. Further, the operation data can be utilized for early detection of amnesia or dementia or the like by analyzing the type of operation buttons of the television remote control that are operated and the frequency of operating the operation buttons. If the operation data is operation data of an air conditioner remote control, the preferred temperature of the user can be known, and in a case where the air conditioner is not being appropriately operated even though the user is at home (which can be known by means of a television remote control or the like) during a period of intense heat or the like, the operation data can be utilized to call the attention of a user to this fact and to also detect the risk of heat stroke in advance, and can also be utilized for offering suggestions for saving energy to a user. In addition, as failure diagnosis, when the device does not operate, it can be ascertained whether the remote control is not working, the main body is not working, or the remote control operation is wrong or the like.

The server apparatus 10 uploads the aggregate results to a monitor site on the Internet. Users can view the aggregate results by logging in with a user ID to the monitor site provided by the server apparatus 10 using the client terminals 50 and 51.

According to the monitoring system according to the present embodiment that is described above, by merely mounting a battery-type power supply device in a battery-powered operation device equipped with a manual operation portion, such as a television remote control or an air conditioner remote control, it is possible to remotely acquire the operation status of such operating devices without the need to improve or replace the relevant operation device and without the necessity to attach a large-scale device thereto, and information regarding the acquired operation status can be utilized in various ways as described above.

While certain embodiments have been described, these embodiments have been presented by way of example only and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

10 . . . SERVER APPARATUS, 20 . . . RELAY TERMINAL, 30 . . . OPERATION DEVICE, 40 . . . BATTERY-TYPE POWER SUPPLY DEVICE, 50 . . . CLIENT TERMINAL, 60 . . . NETWORK.

The invention claimed is:

1. A monitoring system for monitoring manual operations of an operation device having a plurality of manual operation portions for remotely operating an external device, and a battery box that houses a battery comprising:
a battery-type power supply device that is mounted in the battery box, and
a server apparatus that is connected via a network to the battery-type power supply device,
wherein:
the battery-type power supply device includes:
current detection means for detecting an internal current of the operation device, and
transmission means for transmitting data indicating a fluctuation in the detected internal current to the server apparatus; and
the server apparatus includes:
means for receiving the data,
operation identification means for identifying one manual operation portion operated among the plurality of manual operation portions based on the received data, and
means for transmitting information relating to the identified one manual operation portion or a result of aggregation of the information to an external information processing device via the network.

2. The monitoring system according to claim 1, wherein:
the transmission means transmits a code that identifies a manufacturer or a supplier of the external device or the operation device to the external information processing device together with the data indicating a fluctuation in the internal current.

3. The monitoring system according to claim 2, wherein:
the server apparatus further includes means for storing, for each manufacturer, an operation table in which codes corresponding to data indicating a fluctuation in the internal current and codes representing each of the plurality of manual operation portions are associated; and
the operation identification means identifies one manual operation portion operated among the plurality of manual operation portions, by referring to the operation table by means of the data indicating a fluctuation in the internal current and the code identifying the manufacturer.

4. The monitoring system according to claim 1, wherein:
the transmission means transmits a code identifying the battery-type power supply device and a time code indicating a time of manual operation of the operation device to the external information processing device together with the data indicating a fluctuation in the internal current.

5. The monitoring system according to claim 4, wherein:
the server apparatus further comprises means for aggregating operations with respect to the external device using a code identifying the battery-type power supply device and the time code.

6. The monitoring system according to claim 1, wherein:
the external device is a television set and the operation device is a television remote control; and
the operation identification means identifies a channel that is selected by means of the operation device.

7. The monitoring system according to claim 1, wherein:
the battery-type power supply device further includes:
a case having a shape and dimensions which conform to battery standards,
an outer positive terminal and an outer negative terminal provided in the case, and
a battery housing section that houses a battery inside the case, and includes an inner positive terminal and an inner negative terminal that are to come into contact with a positive terminal and a negative terminal of the housed battery respectively; and
the current detection means includes:
a detection resistor interposed between the outer negative terminal and the inner negative terminal, and
a comparator that compares a voltage across the detection resistor with a reference voltage.

8. A battery-type power supply device that is mounted in a battery box of an operation device including a plurality of manual operation portions for remotely operating an external device, comprising:
a case having a shape and dimensions which conform to battery standards;
an outer positive terminal and an outer negative terminal provided in the case, and
a battery housing section that houses a battery inside the case, and includes an inner positive terminal and an inner negative terminal that are to come into contact with front and rear terminals of the housed battery respectively;
current detection means for detecting an internal current of the operation device;
means for storing an operation table in which data indicating a fluctuation in the internal current and codes representing each of the plurality of manual operation portions are associated;
operation identification means for identifying one manual operation portion operated among the plurality of manual operation portions by means of the data indicating a fluctuation in the detected internal current, by referring to the operation table; and
transmission means for transmitting a code representing the identified one manual operation portion to outside.

9. A monitoring server apparatus that is a server apparatus which is connected via a network to a battery-type power supply device that is mounted in a battery box of an operation device including a plurality of manual operation portions for remotely operating an external device, and which monitors manual operations of the operation device, comprising:
means for receiving data indicating a fluctuation in an internal current of the operation device from the battery-type power supply device mounted in the battery box;
operation identification means for identifying one manual operation portion operated among the plurality of manual operation portions based on the received data; and means for transmitting information relating to the identified manual operation portion or a result of aggregation of the information to an external information processing device.

10. A non-transitory storage medium storing a program for causing a computer which is connected via a network to a battery-type power supply device that is mounted in a battery box of an operation device including a plurality of manual operation portions for remotely operating an external device, to function as
means for receiving data indicating a fluctuation in an internal current of the operation device from the battery-type power supply device mounted in the battery box;
operation identification means for identifying one manual operation portion operated among the plurality of manual operation portions based on the received data; and
means for transmitting information relating to the identified manual operation portion or a result of aggregation of the information to an external information processing device.

11. A monitoring system for monitoring operations of an external device having a battery box that houses a battery comprising:
a battery-type power supply device that is mounted in the battery box, and
a server apparatus that is connected via a network to the battery-type power supply device,
wherein:
the battery-type power supply device includes:
current detection means for detecting an internal current of the external device, and
transmission means for transmitting data indicating a fluctuation in the detected internal current to the server apparatus; and
the server apparatus includes:
means for receiving the data,
identification means for identifying an operation of the external device based on the received data, and
means for transmitting information relating to the identified operation or a result of aggregation of the information to an external information processing device via the network.

12. A battery-type power supply device that is mounted in a battery box of an external device, comprising:
a battery housing section that houses a battery;
current detection means for detecting an internal current of the external device;
means for storing an operation table in which data indicating a fluctuation in the internal current and codes representing each of a plurality of operations of the external device are associated;
identification means for identifying an operation of the external device by means of the data indicating a fluctuation in the detected internal current, by referring to the operation table; and
transmission means for transmitting a code representing the identified operation to outside.

13. A monitoring server apparatus that is a server apparatus which is connected via a network to a battery-type power supply device that is mounted in a battery box of an external device, and which monitors operations of the external device, comprising:
means for receiving data indicating a fluctuation in an internal current of the external device from the battery-type power supply device mounted in the battery box;

identification means for identifying an operation of the external device based on the received data; and means for transmitting information relating to the identified operation of the external device or a result of aggregation of the information to an external information processing device.

\* \* \* \* \*